United States Patent
Navare et al.

(10) Patent No.: US 10,686,682 B2
(45) Date of Patent: Jun. 16, 2020

(54) AUTOMATIC SERVER CLASSIFICATION IN CLOUD ENVIRONMENTS

(71) Applicant: BMC Software, Inc., Houston, TX (US)

(72) Inventors: Nitin Navare, Saratoga, CA (US); Sridhar Sodem, Cupertino, CA (US); Mark Rivington, Godalming (GB)

(73) Assignee: BMC Software, Inc., Houston, TX (US)

(*) Notice: Subject to any disclaimer, the term of this patent is extended or adjusted under 35 U.S.C. 154(b) by 177 days.

(21) Appl. No.: 15/852,758

(22) Filed: Dec. 22, 2017

(65) Prior Publication Data
US 2019/0199608 A1 Jun. 27, 2019

(51) Int. Cl.
*H04L 12/26* (2006.01)
*G06F 9/50* (2006.01)
(Continued)

(52) U.S. Cl.
CPC ............ *H04L 43/08* (2013.01); *G06F 9/5033* (2013.01); *G06F 11/3428* (2013.01); *G06F 11/3452* (2013.01); *G06N 20/00* (2019.01); *H04L 43/0876* (2013.01); *H04L 43/16* (2013.01); *H04L 67/1097* (2013.01); *G06F 11/3006* (2013.01); *G06F 2201/83* (2013.01); *H04L 67/1029* (2013.01)

(58) Field of Classification Search
CPC combination set(s) only.
See application file for complete search history.

(56) References Cited

U.S. PATENT DOCUMENTS

| 7,944,822 B1 | 5/2011 | Nucci et al. |
| 8,726,240 B2* | 5/2014 | Gallagher ............ G06F 11/362 717/124 |

(Continued)

FOREIGN PATENT DOCUMENTS

| WO | 2010149186 A1 | 12/2010 |
| WO | 2013126144 A2 | 8/2013 |
| WO | 2016050495 A1 | 4/2016 |

OTHER PUBLICATIONS

Extended European Search Report for European Application No. 18183525.7, dated Feb. 13, 2019, 10 pages.

*Primary Examiner* — Ario Etienne
*Assistant Examiner* — Kidest Mendaye
(74) *Attorney, Agent, or Firm* — Brake Hughes Bellerman LLP

(57) ABSTRACT

A computer system for classifying one or more servers by server type in a networked computing system to institute server-type based monitoring and or maintenance of the networked computing system. The computer system includes a processor, a memory, a data receiver, a server signature generator, and a server-type tagging service. The data receiver collects server performance data for a first server over a time interval. The server signature generator determines a signature of the first server based on the collected server performance data. The server-type tagging service compares the signature of the first server to a signature of a second server of known server type, determines a similarity of the signature of the first server to the signature of the second server, and, based on the similarity, classifies the first server as being of the same server type as the second server.

24 Claims, 4 Drawing Sheets

(51) Int. Cl.
    *G06F 11/34*     (2006.01)
    *H04L 29/08*     (2006.01)
    *G06N 20/00*     (2019.01)
    *G06F 11/30*     (2006.01)

(56) References Cited

U.S. PATENT DOCUMENTS

| | | | |
|---|---|---|---|
| 8,762,538 B2* | 6/2014 | Dutta | G06F 9/5066 |
| | | | 709/226 |
| 9,785,461 B2* | 10/2017 | Anerousis | G06F 9/45558 |
| 2007/0282985 A1* | 12/2007 | Childress | G06F 9/5061 |
| | | | 709/223 |
| 2009/0281817 A1* | 11/2009 | Ferrara | G06Q 10/06 |
| | | | 705/1.1 |
| 2012/0110012 A1* | 5/2012 | Borsos | H04L 41/5067 |
| | | | 707/770 |
| 2012/0191843 A1 | 7/2012 | Ding et al. | |
| 2015/0324609 A1* | 11/2015 | Grubel | G06F 21/64 |
| | | | 726/26 |
| 2017/0046510 A1* | 2/2017 | Chen | G06F 21/552 |
| 2017/0272349 A1 | 9/2017 | Hopkins et al. | |
| 2017/0318083 A1* | 11/2017 | Ignatyev | H04L 67/306 |
| 2018/0060402 A1* | 3/2018 | Fabjanski | G06F 16/22 |
| 2018/0227203 A1* | 8/2018 | Khan | H04L 67/1095 |

\* cited by examiner

FIG. 3

LEGEND: The color coding highlights the value in each cell from white (low) through green (medium) to red (high).

FIG. 4

AUTOMATIC SERVER CLASSIFICATION IN CLOUD ENVIRONMENTS

TECHNICAL FIELD

This description relates evaluating, monitoring, and managing cloud-based services, applications, and infrastructure.

BACKGROUND

Cloud computing or networked computing is a type of computing that provides shared computer processing resources and data to computers and other devices on demand. Cloud computing implementations can enable ubiquitous, on-demand access to a pool of shared computing resources (e.g., computer networks, servers, virtualized servers, storage, application services, etc.), which can be rapidly provisioned. The computing resources can be connected by public networks and or private networks to create the pool of shared computing resources. When applications are run, computing resources can be allocated from the pool of shared computing resources and connected to a user as needed.

Cloud monitoring is the process of evaluating, monitoring, and managing cloud-based services, applications, and infrastructure. Cloud monitoring may be accomplished using a set of tools that supervise the servers, resources, and applications running the applications. Companies can, for example, utilize various application monitoring tools to monitor cloud-based applications. The set of tools may include tools (e.g., performance monitoring tools) that are provided by the cloud provider and or third parties.

An aspect of cloud infrastructure monitoring involves monitoring servers that may be flexibly deployed in the cloud infrastructure to support the cloud-based services. Different servers do different jobs, from serving email and video to protecting internal networks and hosting Web sites, etc. A server "type" may refer to the type of job the server is configured to perform. Server classification refers to identification of server type. In highly dynamic environments and particularly cloud environments, the ability to detect server types may be a key part of the monitoring process. Server classification (i.e., identification of server type) determines monitoring policies as specific server types require specific monitoring in terms of dynamic groupings, cluster membership identification, entities to be monitored, and their acceptable thresholds as well as other key elements of monitoring policies. Without accurate server classification, the monitoring policies can be general and less effective. However, traditional methods of server classification, which are slow to run and time consuming, are often unable to keep up with the rate of change of server configurations and reconfigurations in cloud environments.

Consideration is now being given to cloud infrastructure monitoring. Attention is given, in particular, to accuracy of server classification in cloud computing and other dynamic computing environments.

SUMMARY

Systems and methods for classifying one or more servers by server type in a networked computing system are described herein. Classification of the networked servers by server type allows server-type based monitoring and maintenance of the networked computing system.

In a general aspect, the systems and methods involve collecting server performance data for a first server over a time interval, determining a signature of the first server based on the collected server performance, and comparing the signature of the first server to a signature of a second server of known server type. The systems and methods further involve determining a similarity of the signature of the first server to the signature of the second server, and based on the similarity, classifying the first server as being of the same server type as the second server.

In example implementations, a server signature is a covariance matrix of a set of performance metrics of the server. A server may have multiple signatures depending on the number and kind of performance metrics used to generate the signatures. A reference catalog of server signatures for known server types may be maintained and used as reference to classify newly discovered servers in a networked computer system by server type. In cloud computing environments, the reference catalog may be maintained across multiple tenants in the cloud.

The details of one or more implementations are set forth in the accompanying drawings and the description below. Other features will be apparent from the description and drawings, and from the claims.

BRIEF DESCRIPTION OF THE DRAWINGS

FIG. 3 is an illustration of an example of covariance matrix signatures $\Sigma$s of servers in a test case, in accordance with the principles of the present disclosure.

FIG. 4 is an illustration of an example of difference matrices that may be used to determine the similarity of two covariance matrix signatures $\Sigma$s to classify a newly observed server as being of the same server type as a previously identified server type, in accordance with the principles of the present disclosure.

DETAILED DESCRIPTION

Figure 1:
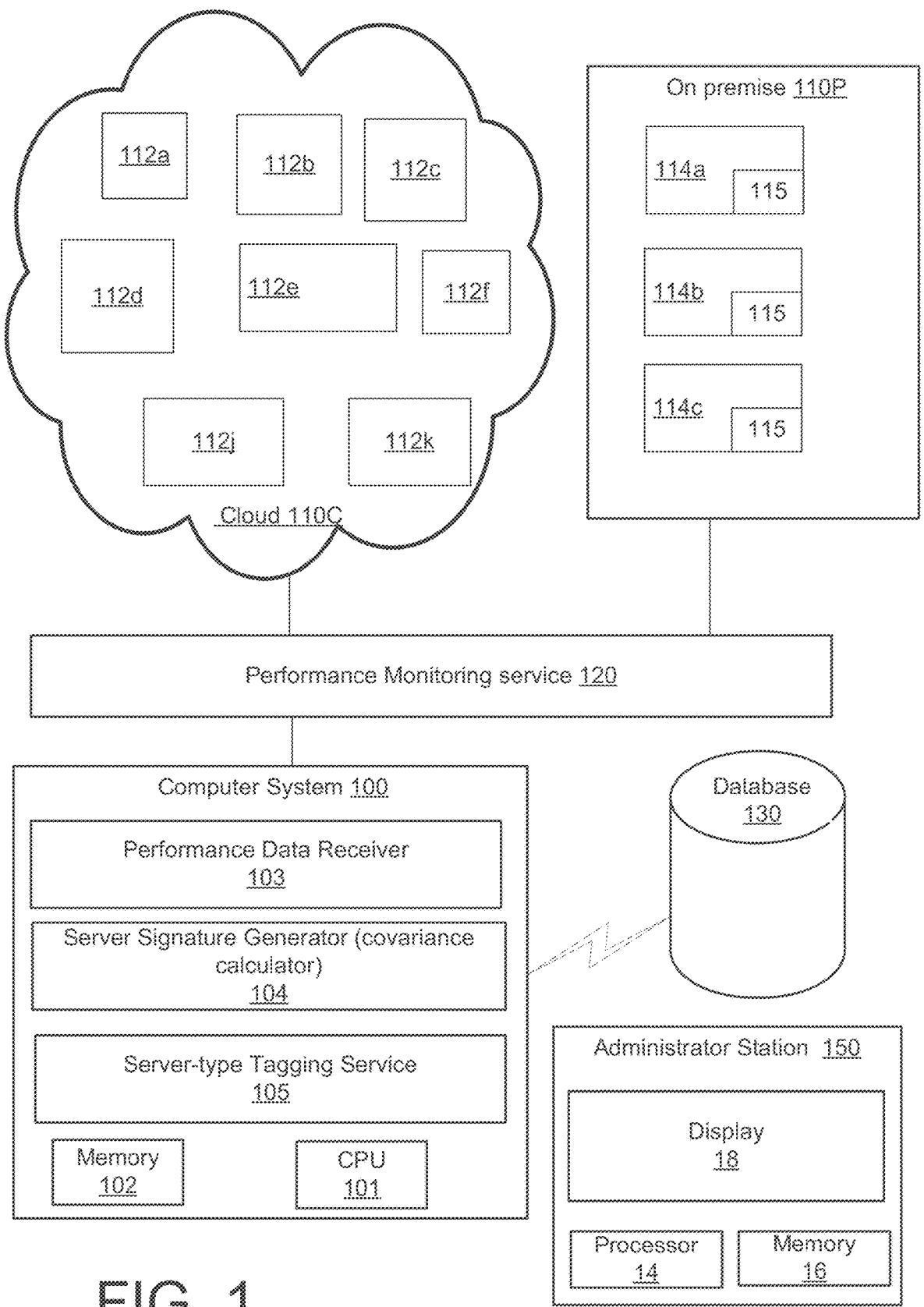
FIG. 1 is a block diagram illustration of an example computer system for classifying server type in a networked computer system (e.g., a cloud computing system, or an on-premise computer system), in accordance with the principles of the present disclosure.

A key aspect of the structure of a cloud computing system is the dynamic and scalable nature of the network of computing resources (components) and their inter-connections in the system. Components can be added to, or removed from, the system in real-time either through human action or through automated systems controls. The network of components and their inter-connections in the cloud computing system can change as the system is dynamically scaled or reconfigured in response to, for example, increase or decrease in load (i.e. network traffic).

Continuous or regular monitoring of the behavior of the dynamically changing infrastructure can play an important role in management and health maintenance of the cloud computing system (e.g. to deliver speed and service quality for application performance, database health, and network data flow, etc.). In highly dynamic environments (e.g., cloud environments), an ability to detect server types may be a key part of the monitoring processes. Server classification can determine monitoring policies as specific server types may require specific monitoring, for example, in terms of dynamic groupings, cluster membership identification, entities to be monitored, and their acceptable thresholds, etc. Without accurate server classification, the monitoring policies may be too general and ineffective.

Traditional server classification involves comparing a specific server configuration (e.g. operating system type, version, patch level, software packages installed, etc.) to a reference catalog of previously collected server configuration templates. Such traditional server classification methods require each user (e.g., a tenant) to install a specialized collection of software tools with system authority to collect low-level configuration information from the servers to be classified. In cloud environments in which infrastructure and resources are shared between multiple users, there can be technical and commercial barriers to installing the specialized collection software on each server because of, for example, security restrictions to low-level data, prohibitive licensing costs related to cloud-scale environments, and lack of access to information controlled by the cloud service provider, etc.

Traditional infrastructure monitoring or decision support tools may be used to compare a server configuration with other servers in a group. However, such traditional comparison does not classify a server in terms of application or technology services (e.g. Cassandra, MongoDB, ElasticSearch, Kafka, NginX, Netty, MySQL, etc.) that the server may be providing. Further, such traditional comparison also does not classify proprietary applications that may be unique to specific tenants of a cloud service.

Traditional server classification methods typically require manual tagging of related servers and/or installation of multiple discovery tools in order to determine some initial classification of the servers in a networked computer system (e.g., a cloud environment).

In accordance with the principles of the present disclosure, systems and methods for automatic classification of servers in a networked computer system (e.g., in a multi-tenant cloud) are described herein. A disclosed server classification method uses observed server behavior data and reinforcement feedback from user inputs across multiple tenants to automatically classify or categorize the servers deployed in the cloud by server type.

In example implementations, a server "type" may be determined by the server's performance or behavior (e.g., resource usage "signature") in the networked computer system without consideration of what applications, programs, or software may have been installed on, or are running on, the server. The server type may be determined by comparing server performance data with performance data of other servers. Servers with similar performance or behavior may be categorized or identified as belonging to the same server type, in accordance with the principles of the present disclosure.

The systems and methods disclosed herein involve collecting performance data on one or more performance metrics relating to the servers' operation in cloud environments, and using the performance data to classify the servers by type. A unique signature, which corresponds to signal patterns in the server's performance data, can be used to identify a server type, for example, by the way the server consumes resources (e.g., central processing unit (CPU), memory, disk, and network resources, etc.) and how the resources are consumed simultaneously. The unique signature for each server may be derived from the performance data for a number of performance metrics including, for example, one or more of CPU utilization (system, idle, user, . . . ), number of processes, number of threads, context switches, load average, memory utilization, disk reads and writes, and network bytes read and written, etc. Performance data for a small number of performance metrics (e.g., 6 to 20 different performance metrics) may be sufficient to obtain the unique signature for each server.

The unique signature for each server derived from the performance data may be characterized or represented numerically. In an example implementation, a server classification type is obtained directly as a function of the numeric representation of a unique signature.

In example implementations, a set of N performance metrics may be represented as a vector $X=[X_1, X_2, \ldots, X_j, \ldots, X_N]$, $j=1$ to N. Further, the unique signature for each server may be characterized numerically by a multivariate covariance matrix $\Sigma$ of the set of N performance metrics for the server. The multivariate covariance matrix $\Sigma$ may be a matrix whose (i, j) entry is the covariance $\Sigma(i, j)=\text{cov}(X_i, X_j)=E[(X_i-\mu_i)(X_j-\mu_j)]=E[X_i X_j]-\mu_i \mu_j$, where the operator E denotes the expected (mean) value of its argument, and $\mu_i=E(X_i)$.

Server classification data (i.e., covariance matrix signature vs. server type data) from present and previous server classification efforts may be persisted in a reference data store or catalog. Identification of a server classification type for a newly observed server may be based, for example, on comparison of the covariance matrix signature of the newly observed server and the covariance matrix signatures of previously classified servers. It may be expected that in many instances this covariance matrix signature comparison will be sufficient for identification of the server type of the newly observed server. In case of ambiguity (e.g., when a comparison of the covariance matrix signature of a newly observed server and the covariance matrix signatures of previously classified servers is ambiguous), univariate characteristics (e.g., mean, range, standard deviation, kurtosis, and skew) of the server performance data may be used to refine the comparison process for identification of the server type of the newly observed server.

Machine learning techniques may be used in conjunction with the systems and methods disclosed herein to continually improve server classification based on comparison of the covariance matrix signature of the newly observed server and the covariance matrix signatures of previously classified servers. Machine learning techniques may involve user feedback and increasing the amount of covariance matrix signature vs. server type data persisted in the reference data store after each server classification effort.

In accordance with the principles of the present disclosure, performance data relating to servers in cloud environments is used to classify the servers by type. A unique signature for each server is derived from the performance data. The unique signature, which corresponds to signal patterns in the server's performance data, can be used to identify a server type by the way the server consumes resources (e.g., central processing unit (CPU), memory, disk, and network resources) and how those are consumed simultaneously. The performance data may be collected via monitoring solutions for the networked computer system (e.g., a cloud environment).

Publically available cloud computing platforms (e.g. Amazon Web Services (AWS) cloud, Microsoft Azure cloud, etc.) provide cloud computing services (e.g. Software-as-a-Service (SaaS)) to the public. On such cloud computing platforms, server performance data (for a tenant) may be available through "performance" application programming interfaces (APIs) of monitoring solutions that are provided by the cloud service providers (e.g., performance APIs such as AWS CloudWatch and Azure Monitor). In such cases (where the cloud computing platform itself provides performance APIs), the systems and methods for classification of servers described herein may utilize read-only access to a cloud service account to access the performance APIs to obtain server performance data.

In instances where the computing platform (e.g., an on-premise networked computer system) does not itself provide a performance API, server performance data may be obtained via one or more monitoring agents installed on the servers in the computing platform. In example implementations, the monitoring agents used may not rely on any specific discovery software and may not require elevated levels of authority to perform any specific detection activity in the computing platform (e.g., the on-premise networked computer system).

FIG. 1 is a block diagram that illustrates an example computer system 100 for classifying server type in a networked computer system (e.g., cloud computing system 110C, or on-premise computer system 110P), in accordance with the principles of the present disclosure. Cloud computing system 110C may, for example, include a plurality of servers 112a-112k (e.g., real and virtual server instances, compute services, etc.). Similarly, on-premise computer system 110P may, for example, include a plurality of servers 114a-114c (e.g., real and virtual server instances, compute services, etc.). Computer system 100 may determine the server type of a server (e.g., server 112a-112k or server 114a-114b, etc.) based on the performance behavior of the server in the networked computer system.

In example implementations, computer system 100, which includes CPU 101 and memory 102, may be coupled to a database 130 and an administrator station 150. Computer system 100 may include a performance data receiver 103, a server signature generator 104, and a server-type tagging service 105. Further, computer system 100 may include or be coupled to a performance monitoring service 120.

In cases that the networked computer system is a publicly available cloud service (e.g., cloud computing system 110C), the performance data of the servers (e.g., servers 112a, 112b, 112c, . . . 112k, etc.) may be monitored and provided by the cloud service provider. In cases that the networked computer system, is an on-premise computer system (e.g., on-premise computer system 110P), the performance data of the servers (e.g., servers 114a, 114b, 114c, etc.) may be monitored and provided by monitoring agents (e.g., agents 115) hosted on individual servers (e.g., servers 114a, 114b, 114c, etc.). Agents 115 may, for example, observe specific performance aspects or categories (e.g., CPU utilization, context switches, load average, disk reads, disk writes, and network bandwidth usage, etc.) of servers 114a-114c.

Performance monitoring service 120 may regularly monitor system performance of computing resources 112 and may report the system performance data, for example, at regular times (e.g., every minute) over an extended time interval (e.g., a week).

For server classification, performance data receiver 103 in computer system 100 may obtain performance data of the servers via performance monitoring service 120. The performance data may be for a set of performance metrics including, for example, one or more of CPU utilization (system, idle, user, . . . ), number of processes, number of threads, context switches, load average, memory utilization, disk reads and writes, network bytes read and written, etc. The performance data, which may be received over a time interval, (e.g., a week) may be stored in database 130. Database 130 may also store performance signatures (i.e., covariance matrix signatures) vs. server type data of the servers.

In computer system 100, server signature generator 104 may use the performance data to generate a performance signature (i.e., covariance matrix signature) of a newly observed server (i.e., a server that needs to be typed or classified). Further, server-type tagging service 105 may compare the performance signature of the newly observed server with the performance signatures of other servers that may be stored in database 130. Server-type tagging service 105 may identify a server type for the newly observed server based on a similarity of the performance signature of the newly observed server to the performance signature of another server of known or pre-determined type.

Computing system 100, which may be hosted on one or more physical or virtual machines, may be accessible to, or connected to, a client computer (e.g., administrator station 150). Administrator station 150, which may be connected to computing system 100, may include a processor 14, a memory 16, and a display 18. An administrator may use computing system 100 to supervise processes for server classification of servers in cloud computing system 110C (or on-premise computer system 110P) (e.g., on demand) and to view results (e.g., server performance signatures), for example, on display 18 of administrator station 150.

In example implementations, computer system 100 may be configured to allow viewers an opportunity to validate, modify, enhance, or reject observed server classifications and server performance signatures that may be shown, for example, in display 18.

Figure 2:
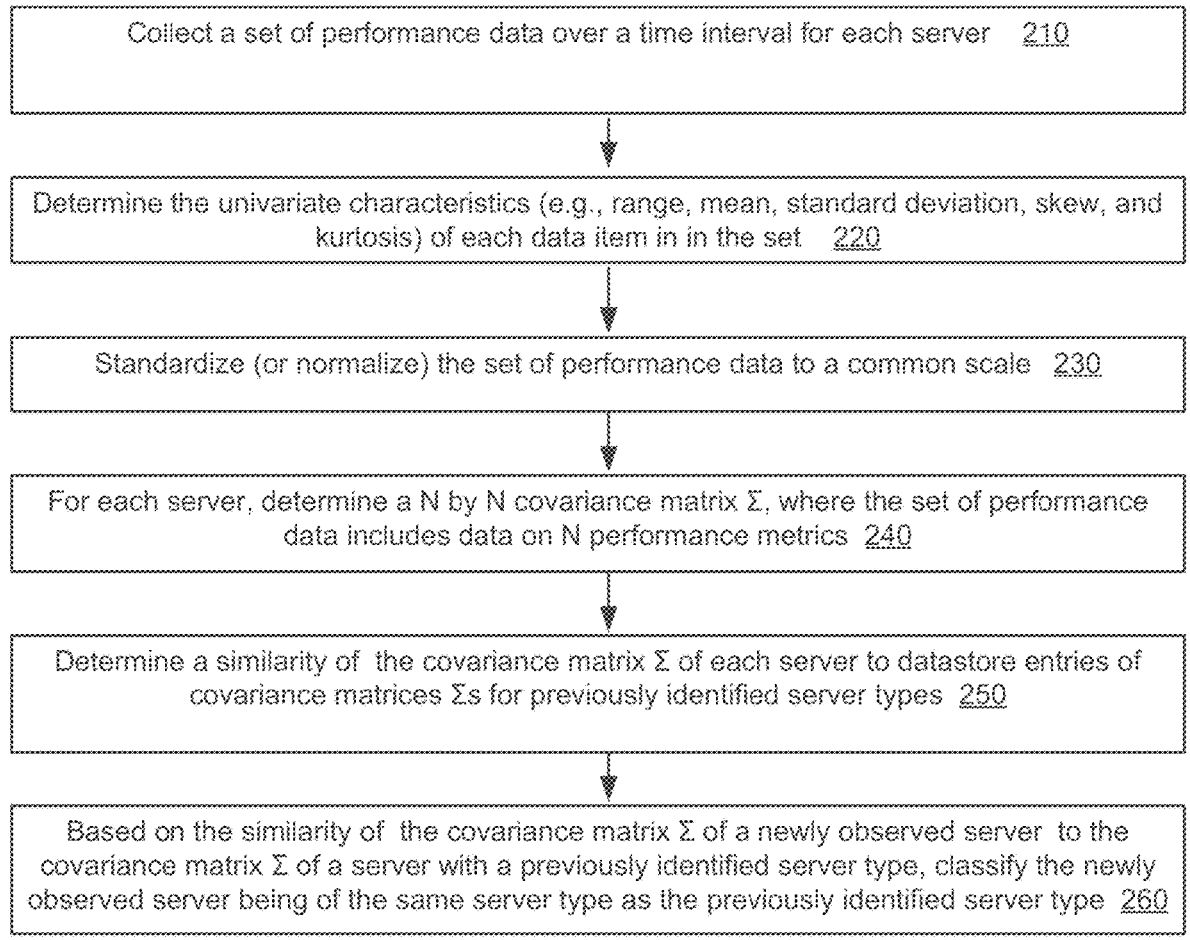
FIG. 2 is an illustration of an example method for classifying server type in a networked computer system (e.g., a cloud computing system, or an on-premise computer system), in accordance with the principles of the present disclosure.

FIG. 2 shows an example method 200 for classifying server type in a networked computer system (e.g., cloud computing system 110C, or on-premise computer system 110P), in accordance with the principles of the present disclosure.

Method 200 may be implemented using computer system 100.

In the following description of method 200, the term "server" is used generically for any type of computer resource. However, it will be understood that term may represent any entity (e.g. server, container instance, compute service, etc.) in the networked computing system for which system performance data can monitored (e.g., by performance monitoring service 120). Performance monitoring service 120 may regularly monitor system performance over a monitoring time period, and may report the system performance, for example, periodically (e.g., every minute). The system performance data reports may include timestamps of the reporting time.

In an example implementation, method 200 includes collecting a set of server performance data over a time interval for each server (210). The performance data may include data on one or more performance metrics (e.g., CPU utilization (system, idle, user, . . . ), number of process, number of threads, context switches, load average, memory utilization, disk reads and writes, and network bytes read and written). As an example, a specific set of performance data used may include data on six metrics, namely, CPU utilization, Disk Bytes Reads, Disk Bytes Writes, Memory, Net Bytes Reads, and Net Bytes Writes.

Method 200 may further include determining one or more univariate characteristics (e.g., range, mean, standard deviation, skew, and kurtosis) of each data item in the set of performance data (220), and standardizing or normalizing the performance data to a common scale in preparation for computing a covariance matrix Σ (230).

Method 200 further includes, for each server, determining an N-by-N covariance matrix Σ, where the set of performance data includes data on N performance metrics (240), and determining a similarity of the covariance matrix Σ of each server to datastore entries of covariance matrices Σs for previously identified server types to determine a server type of each server (250).

Method 200 may further include based on the similarity of the covariance matrix Σ of a newly observed server to the covariance matrix Σ of a server with a previously identified server type, classifying the newly observed server being of the same server type as the previously identified server type (260).

Since the performance data is standardized to a common scale at 230, the elements Σ (i, j) of the covariance matrix Σ determined at 240 will each have values in the range of −1 to 1. In example implementations, determining a similarity of the covariance matrix Σ to a covariance matrix Σ for a previously identified server type to may involve an evaluation of element-to-element differences of the two covariance matrices. Two elements may be considered to be similar if, for example, the difference between the values of the two elements is less than a pre-determined tolerance level (e.g., 0.1). Two covariance matrices (e.g., corresponding to Server A and Server B, respectively) may be determined to similar (and hence representing servers of similar type) when all element-to-element differences between the two covariance matrices are less than a pre-determined tolerance level (e.g., 0.1). In example implementations, evaluation of element-to-element differences between the two covariance matrices may be accomplished by producing a difference matrix by taking the absolute values of the element-to-element matrix subtraction of the two covariance matrices (e.g., corresponding to Server A and Server B). If all elements of the difference matrix are less than the pre-determined tolerance level (e.g., 0.1), Server A may be classified as being of the same server type as Server B.

In some instances, covariance matrix signature of Server A may be similar to more than one covariance matrix signature (e.g., to a covariance matrix signature corresponding to server type C and to a covariance matrix signature corresponding to server type D). In such instances, method 200 at 260 may result in ambiguous classification of server A as being of the same server type as Server C and also as being of the same server type as Server D. Such instances of the ambiguity may be resolved by additionally comparing univariate characteristics (e.g., mean, range, standard deviation, kurtosis, and skew) of the server performance data of the servers (i.e., Server A, Server C, and Server D) to determine a proper classification of server A, for example, as being either of the same server type as Server C or of the same server type as Server D.

Example Covariance Matrices

Figure 3:
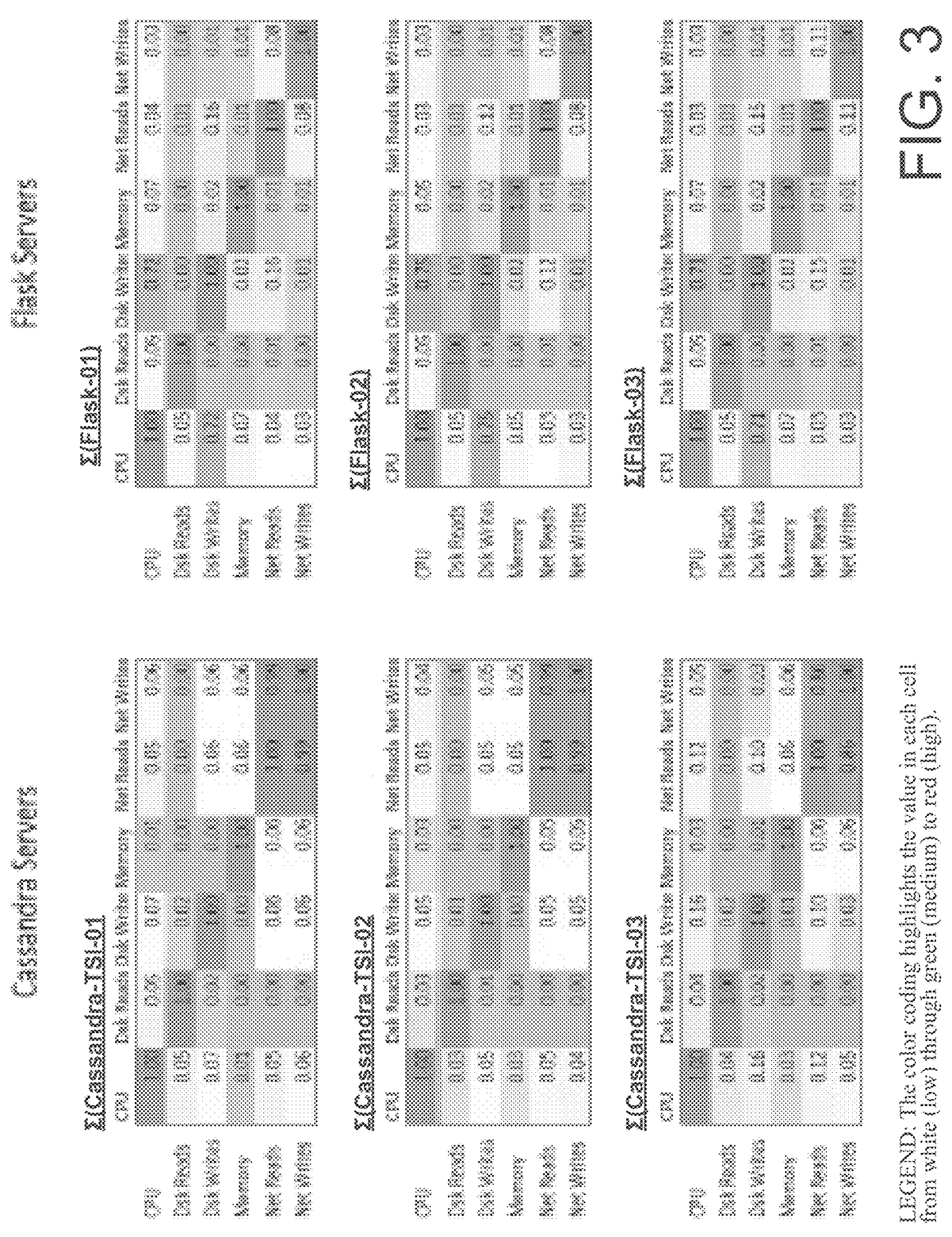

FIG. 3 shows, for example, covariance matrix signatures Σ of six servers that were obtained in a test case, in accordance with the principles of the present disclosure. In the test case, six servers (e.g., three servers of "Cassandra" type that are labelled Cassandra-TSI-01, Cassandra-TSI-02, and Cassandra-TSI-03, respectively, and three servers of "Flask" type that are labelled Flask-01, Flask-02, and Flask-03, respectively) were deployed in a SaaS environment. Performance data for each server was collected over a time interval of one week. The covariance matrix signatures of each of the six servers were determined (method 300 at 340) using performance data for six performance metrics (i.e., CPU Utilization, Disk Bytes Read, Disk Bytes Written, Memory Utilization, Network Bytes Read, and Network Bytes Written). These six covariance matrix signatures (labeled as Σ (Cassandra-TSI-01), Σ (Cassandra-TSI-02), Σ (Cassandra-TSI-03), Σ (Flask-01), Σ (Flask-02), and Σ (Flask-03), respectively) are shown, for example, in FIG. 3 under column headings Cassandra servers and Flask servers.

As consistent with the mathematical properties of covariance, the diagonal elements (e.g., elements Σ (i=j)) of all six covariance matrix signatures shown in FIG. 3 are equal 1.0, and the values of the off-diagonal elements (e.g., elements Σ (i≠j)) in each of the six covariance matrix signatures shown in FIG. 3 are symmetric about the diagonal. Further, visual inspection of the numeric covariance values of six covariance matrix signatures in FIG. 3 readily shows that the covariance matrix signatures (i.e., Σ (Cassandra-TSI-01), Σ (Cassandra-TSI-02), and Σ (Cassandra-TSI-03)) of three servers of Cassandra type are similar to each other. For example, the numeric value Σ (Net Writes, Net Reads) for each of the three servers of Cassandra type is about 0.086 to 0.99, while the numeric values of the other off-diagonal elements are 0.6 or less. Similarly, visual inspection of the numeric values of six covariance matrix signatures in FIG. 3 readily shows that the covariance matrix signatures and the covariance matrix signatures (i.e., Σ (Flask-01), Σ (Flask-02) and Σ (Flask-03)) of the three servers of Flask type are similar to each other. For example, the numeric value Σ (Disk Writes, Disk Reads) for each of the three servers of Flask type is about 0.71 to 0.75, while the numeric values of the other off-diagonal elements are 0.15 or less. The visual inspection also readily shows that the covariance matrix signatures of the three servers of Cassandra type and the covariance matrix signatures of the three servers of Flask type are dissimilar. For example, as noted above the numeric value Σ (Disk Writes, Disk Reads) for each of the three servers of Flask type is about 0.71 to 0.75, while the numeric value Σ (Disk Writes, Disk Reads) for each of the three servers of Cassandra type is 0.16 or less.

Figure 4:
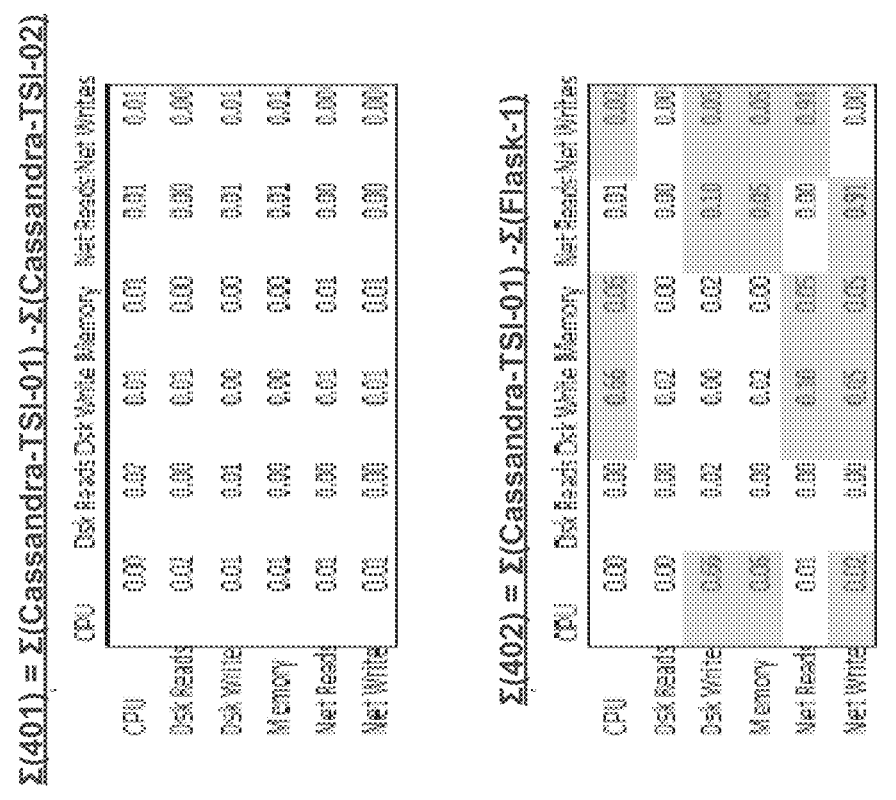

FIG. 4 shows example difference matrices (401 and 402) that may be used to determine the similarity of two covariance matrix signatures (e.g., at 360 in method 300 to classify the newly observed server being of the same server type as the previously identified server type). Difference matrix 401 shown in FIG. 4 may be obtained by taking absolute values of the differences between the elements of Σ (Cassandra-TSI-01) and the corresponding elements of Σ (Cassandra-TSI-02) that are shown in FIG. 3. Similarly, difference matrix 402 shown in FIG. 4 may be obtained by taking absolute values of the differences between the elements of Σ (Cassandra-TSI-01) and the corresponding elements of Σ (Flask-01) that are shown in FIG. 3.

Visual inspection of difference matrix 401 readily reveals that the all elements of the matrix have small numeric values (e.g., less than 0.1) supporting a conclusion that servers Cassandra-TSI-01 and Cassandra-TSI-02 are both of a same server type and should be classified as such. Further, visual inspection of difference matrix 402 readily reveals that not all elements of the matrix have small numeric values (e.g., less than 0.1). For example, element Σ (Disk Write, Disk Write)=0.66, and element Σ (Net Write, Net Write)=0.91, are both substantially greater than 0.1 supporting a conclusion that servers Cassandra-TSI-01 and Flask-01 are of different server types.

In this example only six performance metrics were used, but even with that small number performance metrics, significant similarities and differences between the covariance matrix signatures of servers can be determined to classify or categorize the servers by type. The data for each server was collected over a week and reduced to a small "fingerprint" covariance matrix (e.g., 6 by 6 matrix $\Sigma$ (Cassandra-TSI-01)). No additional software was required or used to classify the servers.

It will be understood that a server may have multiple signatures depending, for example, on the number or kinds of performance metrics that are used to construct the covariance matrix signatures.

In example implementations, for example, in a SaaS environment, the cloud service provider provides performance data using APIs. Thus, no additional software installation is required for the systems and method of server classification described herein. While the covariance matrices can be automatically compared to classify the category or type of server, the classification types may be reinforced or confirmed by users via machine learning feedback channels.

As discussed previously, there may be multiple unique signatures associated with each server or server type. A datastore or catalog of the unique signatures for each server classification type may be maintained and used for expediting classification of newly found servers. In example implementations of the systems and methods described herein, for example, in SaaS environments, the catalog of unique signatures for each server classification type may be maintained across, and accessible by, all tenants of the SaaS environments. Maintaining the catalog across all tenants may be expected to increase accuracy in server-type classification.

Implementations of the various techniques described herein may be implemented in digital electronic circuitry, or in computer hardware, firmware, software, or in combinations of them. Implementations may be implemented as a computer program product, i.e., a computer program tangibly embodied in a non-transitory information carrier, e.g., in a machine-readable storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user, and a keyboard and a pointing device, e.g., a mouse or a trackball, by which the user can provide input to the computer. Other kinds of devices can be used to provide for interaction with a user as well. For example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface, or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments. It should be understood that the appended claims are presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components, and/or features of the different embodiments described.

What is claimed is:

1. A method for classifying one or more servers by server type in a networked computing system to institute server-type based monitoring and maintenance of the networked computing system, the method comprising:

collecting server performance data for a first server over a time interval;

determining a signature of the first server based on the collected server performance data;

comparing the signature of the first server to a signature of a second server of known server type;

determining a similarity of the signature of the first server to the signature of the second server, and based on the similarity classifying the first server as being of the same server type as the second server;

using a univariate characteristic of a set of performance metrics of the first server to resolve ambiguity in the similarity of the signature of the first server to the signature of the second server and to a signature of a third server, wherein the univariate characteristic includes one of a mean, a range, a standard deviation, a kurtosis, and a skew of the set of performance metrics; and, based on the ambiguity resolution, classifying the first server as being of the same server type as the second server or as being of the same server type as the third server.

2. The method of claim 1, wherein collecting server performance data for a first server over a time interval includes collecting data on a set of performance metrics of the first server, the set of performance metrics being related to consumption of resources including one or more of central processing unit (CPU) utilization, disk bytes reads, disk bytes writes, memory usage, net bytes reads, and net bytes writes.

3. The method of claim 2, wherein determining a signature of the first server includes determining a covariance matrix of the set of performance metrics for the first server and designating the covariance matrix as being the covariance matrix signature of the first server.

4. The method of claim 3, wherein a covariance matrix signature of the second server is persisted in a data store, and wherein comparing the signature of the first server to a signature of the second server includes comparing the covariance matrix signature of the first server and the covariance matrix signature of the second server retrieved from the data store.

5. The method of claim 4, wherein determining a similarity of the signature of the first server to the signature of the second server includes determining absolute values of the differences between elements of the covariance matrix signature of the first server and corresponding elements of the covariance matrix signature of the second server, and when the absolute values of all the differences are less than a pre-defined threshold value, determining the signature of the first server and the signature of the second server to be similar.

6. The method of claim 5, wherein determining absolute values of the differences between elements of the covariance matrix signature of the first server and corresponding elements of the covariance matrix signature of the second server includes computing a difference matrix of the covariance matrix signature of the first server and the covariance matrix signature of the second server.

7. The method of claim 1, wherein each of the servers has one or more signatures associated with it, and the method further comprises:
maintaining a catalog of server signatures for each server type in the networked computing system.

8. The method for claim 1, wherein the networked computing system is in a Software-as-a-Service (SaaS) environment having multiple tenants, and wherein the method further includes maintaining a catalog of signatures of the servers by server type across the multiple tenants in the SaaS environment.

9. A computer system for classifying one or more servers by server type in a networked computing system to institute server-type based monitoring and maintenance of the networked computing system, the system comprising:
a processor;
a memory;
a data receiver configured to collect server performance data for a first server over a time interval;
a server signature generator configured to determine a signature of the first server based on the collected server performance data; and
a server-type tagging service configured to:
compare the signature of the first server to a signature of a second server of known server type;
determine a similarity of the signature of the first server to the signature of the second server;
based on the similarity, classify the first server as being of the same server type as the second server;
use a univariate characteristic of a set of performance metrics of the first server to resolve ambiguity in the similarity of the signature of the first server to the signature of the second server and to a signature of a third server,
wherein the univariate characteristic includes one of a mean, a range, a standard deviation, a kurtosis, and a skew of the set of performance metrics; and,
based on the ambiguity resolution, classify the first server as being of the same server type as the second server or as being of a same server type as the third server.

10. The computer system of claim 9, wherein the data receiver collects data on a set of performance metrics of the first server, the set of performance metrics being related to consumption of resources including one or more of central processing unit (CPU) utilization, disk bytes reads, disk bytes writes, memory usage, net bytes reads, and net bytes writes.

11. The computer system of claim 10, wherein the server signature generator determines a covariance matrix of the set of performance metrics for the first server, and designates the covariance matrix as being the covariance matrix signature of the first server.

12. The computer system of claim 11, wherein a covariance matrix signature of the second server is persisted in a data store, and wherein the server-type tagging service compares the covariance matrix signature of the first server and the covariance matrix signature of the second server retrieved from the data store.

13. The computer system of claim 12, wherein the server-type tagging service determines absolute values of the differences between elements of the covariance matrix signature of the first server and corresponding elements of the covariance matrix signature of the second server, and when the absolute values of all the differences are less than a pre-defined threshold value, determines the signature of the first server and the signature of the second server to be similar.

14. The computer system of claim 13, wherein the server-type tagging service determines absolute values of the differences between elements of the covariance matrix signature of the first server and corresponding elements of the covariance matrix signature of the second server by computing a difference matrix of the covariance matrix signature of the first server and the covariance matrix signature of the second server.

15. The computer system of claim 9, wherein each of the servers in the networked computing system have one or more signatures associated with them, and wherein the server signature generator is configured to maintain a catalog of server signatures for each server type in the networked computing system.

16. The computer system of claim 9, wherein the networked computing system is in a Software-as-a-Service (SaaS) environment having multiple tenants, and wherein the server signature generator is configured to maintain a catalog of signatures of the servers by server type across the multiple tenants in the SaaS environment.

17. A computer program product, the computer program product being tangibly embodied on a non-transitory computer-readable storage medium and comprising instructions that, when executed, are configured to cause at least one computing device to classify one or more servers by server type in a networked computing system to institute server-type based monitoring and maintenance of the networked computing system by:
- collecting server performance data for a first server over a time interval;
- determining a signature of the first server based on the collected server performance data;
- comparing the signature of the first server to a signature of a second server of known server type;
- determining a similarity of the signature of the first server to the signature of the second server; and,
- based on the similarity, classifying the first server as being of the same server type as the second server;
- using a univariate characteristic of a set of performance metrics of the first server to resolve ambiguity in the similarity of the signature of the first server to the signature of the second server and to a signature of a third server,
- wherein the univariate characteristic includes one of a mean, a range, a standard deviation, a kurtosis, and a skew of the set of performance metrics; and,
- based on the ambiguity resolution, classifying the first server as being of the same server type as the second server or as being of the same server type as the third server.

18. The computer program product of claim 17, wherein the instructions, when executed, cause the at least one computing device to:
- collect data on a set of performance metrics of the first server, the set of performance metrics being related to consumption of resources including one or more of central processing unit (CPU) utilization, disk bytes reads, disk bytes writes, memory usage, net bytes reads, and net bytes writes.

19. The computer program product of claim 18, wherein the instructions, when executed, cause the at least one computing device to:
- determine a covariance matrix of the set of performance metrics for the server, and designates the covariance matrix as being the covariance matrix signature of the first server.

20. The computer program product of claim 19, wherein a covariance matrix signature of the second server is persisted in a data store, and wherein the instructions, when executed, cause the at least one computing device to:
- compare the covariance matrix signature of the first server and the covariance matrix signature of the second server retrieved from the data store.

21. The computer program product of claim 20, wherein the instructions, when executed, cause the at least one computing device to:
- determine absolute values of the differences between elements of the covariance matrix signature of the first server and corresponding elements of the covariance matrix signature of the second server; and
- when the absolute values of all the differences are less than a pre-defined threshold value, determine the signature of the first server and the signature of the second server to be similar.

22. The computer program product of claim 21, wherein the instructions, when executed, cause the at least one computing device to:
- determine absolute values of the differences between elements of the covariance matrix signature of the first server and corresponding elements of the covariance matrix signature of the second server by computing a difference matrix of the covariance matrix signature of the first server and the covariance matrix signature of the second server.

23. The computer program product of claim 17, wherein each of the servers in the networked computing system have one or more signatures associated with them, and wherein the instructions, when executed, cause the at least one computing device to:
- maintain a catalog of server signatures for each server type in the networked computing system.

24. The computer program product of claim 17, wherein the networked computing system is in a Software-as-a-Service (SaaS) environment having multiple tenants, and wherein the instructions, when executed, cause the at least one computing device to:
- maintain a catalog of signatures of the servers by server type across the multiple tenants in the SaaS environment.

* * * * *